July 3, 1962 H. K. STRASS 3,041,924
MOTION PICTURE CAMERA FOR OPTICAL PYROMETRY
Filed Nov. 18, 1959 2 Sheets-Sheet 1

INVENTOR
HERBERT KURT STRASS

BY
ATTORNEYS

July 3, 1962 H. K. STRASS 3,041,924
MOTION PICTURE CAMERA FOR OPTICAL PYROMETRY
Filed Nov. 18, 1959 2 Sheets-Sheet 2

INVENTOR
HERBERT KURT STRASS

BY

ATTORNEYS

_United States Patent Office_ 3,041,924
Patented July 3, 1962

3,041,924
MOTION PICTURE CAMERA FOR OPTICAL PYROMETRY
Herbert Kurt Strass, Newport News, Va., assignor to the United States of America as represented by the Administrator of National Aeronautics and Space Administration
Filed Nov. 18, 1959, Ser. No. 853,983
3 Claims. (Cl. 88—16)
(Granted under Title 35, U.S. Code (1952), sec. 266)

The invention described herein may be manufactured and used by or for the Government of the United States of America for governmental purposes without the payment of any royalties thereon or therefor.

This invention relates generally to a continuously variable exposure control device for optical photographic systems, and more particularly to a filter arrangement used in combination with the lens system of a photographic camera.

One particularly useful application of the instant invention is in the field of optical pyrometry. The employment of photographic technology in pyrometry, as presently practiced, is confined to a relatively narrow range of temperatures due to the limited capability of present day photographic emulsions to reproduce the brightness contrast of an object as it is heated. In order to determine surface temperatures of an object wherein the temperature variation is more than a hundred degrees Fahrenheit, current practice necessitates the use of two or more cameras employing different exposure settings. As many as eight cameras may be necessary to provide an adequate exposure range for many applications of this technique. For example, the surface temperatures of an aircraft model subject to aerodynamic heating in a supersonic heated wind tunnel may vary as much as 4,000 degrees Fahrenheit during the testing period, which would entail the use of an unreasonable number of cameras if temperature measurements of the model were desired over this entire range. The filter arrangement herein proposed, however, when used in combination with a single high speed motion picture camera, may be used in making an accurate and complete record of the temperature history of such a heated model. It will also be apparent to those skilled in the art of temperature measurement that the combination hereinafter more fully disclosed may be used in measuring the temperature history of any heated object over very wide ranges.

The filter arrangement of the present invention may also be utilized to advantage in the art of aerial photography. For example, as an aircraft follows a course over a strip of land to be photographed, a downwardly aimed camera mounted therein makes a series of photographs of the terrain. Since natural light is relied upon in making these photographs, it will be apparent that the degree of illumination may vary considerably from frame to frame, depending upon cloud formations and the like. Consequently, it is deemed desirable to provide the camera with exposure control means responsive to changes in illumination to obtain a series of photographs made under uniform lighting conditions. This result may be realized by providing the aerial camera with the variable exposure filter arrangement of the present invention. The filter exposure level may be controlled by a mechanical servo-system responsive to the input of a photoelectric cell sensitive to variation in light intensity.

The filter arrangement herein disclosed for use with an aerial camera may also be utilized in other photographic applications; such as, for example, in a missile firing range tracking camera or in a television camera. The photoelectric cell and servo-system control responsive thereto would be similarly used in these applications of the filter arrangement.

Accordingly, it is an object of the present invention to provide a new and improved variable exposure control device for photographic optical systems.

Another object of the instant invention is to provide a new and improved filter arrangement for varying the intensity of light admitted to a photographic optical system.

A still further object of the present invention is to provide a pair of superimposed filter discs arranged to cover the lens element of a photographic optical system and to uniformly vary the intensity of light admitted thereto.

Other objects and many of the attendant advantages of the invention will be readily appreciated as the same becomes better understood by reference to the following detailed description when considered in connection with the accompanying drawings wherein.

Figure 1:
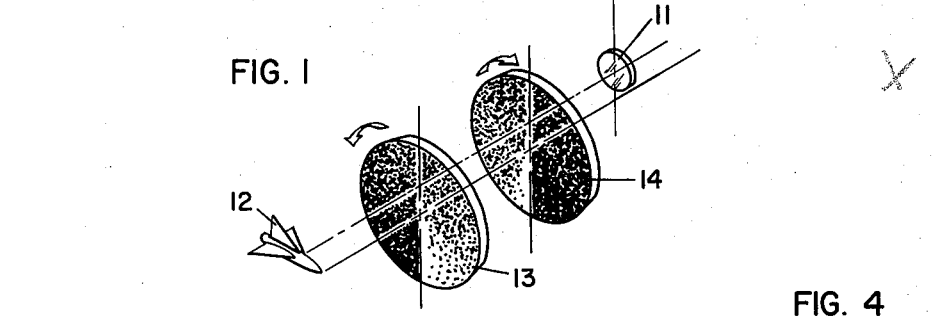
FIG. 1 is a schematic representation of the filter arrangement combined with the lens component of a photographic optical system.

Referring now more particularly to the drawings wherein like reference numerals designate identical parts throughout the several views, and more particularly to FIG. 1, there is shown a schematic repesentation of the filter arrangement of the present invention in combination with the lens element of a photographic camera system. The lens element 11 of the camera is aligned on an axis with an object 12 of which photographs are to be made. Interposed between lens 11 and object 12 are a pair of filter disc elements 13 and 14. Discs 13 and 14 are arranged to rotate about a common central axis parallel to, but offset from, the line between lens 11 and object 12; the lens 11 being covered by discs 13 and 14 between the centers of rotation and the rims thereof.

Figure 2:
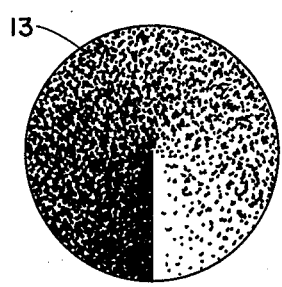
FIG. 2 is a view of one of the filter discs of FIG. 1 looking along the axis of rotation thereof.

FIG. 2 is a view of disc filter element 13 taken along the axis of rotation thereof. The periphery of disc 13 defines a circle with the center thereof coincident with the axis of rotation. Disc 13 is made linearly variable in transmission density in a circular direction around the center thereof, with each ray, or radial line, from the center to the periphery of the disc being constant in density. An initial ray has a transmission density value of zero, and each succeeding ray around the disc increases in density according to a linear gradient until a terminal ray of maximum density D immediately adjacent the initial ray is reached. Filter discs of this type are commercially available, one source of supply being the Eastman Kodak Co., Rochester, N.Y., and taken alone do not constitute the invention sought to be protected hereby.

Figure 3:
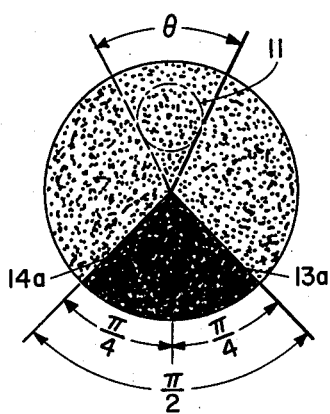
FIG. 3 is a view of the filter discs of FIG. 1 looking along the axis of rotation thereof; the discs being superimposed and each being rotated through an angle of $\pi/4$ radians in the direction indicated by the arrowheads of FIG. 1.

FIG. 3 is a view of superimposed disc filter elements 13 and 14 taken along the axis of rotation thereof. Disc 14 is exactly identical with disc 13, but is so mounted on the common rotational axis with disc 13 that the density gradients of the two discs are opposite in sign. Initially, the boundaries marking the abrupt transition from zero to maximum density of each disc are aligned, as indicated in FIG. 1. Referring once again to FIG. 3, the two discs are shown after each has been rotated through an angle of $\pi/4$ radians in the direction indicated by the arrowheads of FIG. 1. The reference numerals 13a and 14a are shown leading to the boundary between the zero and maximum density rays of filter discs 13 and 14, respectively. It will be readily apparent that the total density of the filter arrangement is equal, at any radial position, to the sum of the densities of the superimposed discs, and that the opposed increasing density trends of discs 13 and 14 create in the filter arrangement two zones uniform in density which vary linearly with relative rotation of discs 13 and 14. The lens element 11 of the photographic camera system is shown in phantom outline superimposed upon the filter arrangement of FIG. 3. It will be noted that the lens element 11 is positioned between the center and the rim of the filter discs and may be thereby completely covered by a filter uniform density region. The angle between two rays drawn from the center of the filter arrangement to the rim thereof tangent to opposite edges of lens element 11 and identified by the reference letter $\theta$ indicates that portion of the filter arrangement inoperable to uniformly cover lens 11 during one complete revolution of each of the discs 13 and 14 due to the boundary rays between the zero and maximum density portions of each disc passing over lens 11.

Figure 4:
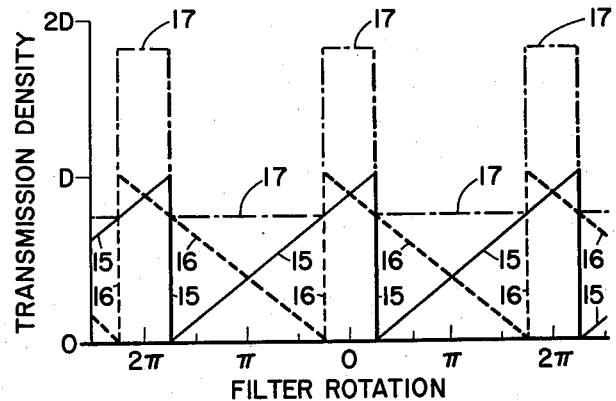
FIG. 4 is a graphical representation of the variation in transmission density between the two uniform density regions of the filter disc arrangement of FIG. 3.

FIG. 4 graphically represents the variation in transmission density between the two uniform density regions of the filter arrangement. The filter arrangement is represented with each disc element having been rotated through an angle of $\pi/4$ radians in the direction of the arrowheads of FIG. 1. The solid line 15 represents the transmission density of the disc element 13 through an angle of $2\pi$ radians, and the broken line 16 represents the transmission density of the disc element 14 through an angle of $2\pi$ radians. The transmission density of each disc is shown by lines 15 and 16 to increase from zero to maximum density D through an angle of $2\pi$ radians; the maximum density ray of each disc being displaced from its initial position by $\pi/4$ radians. The total filter arrangement density in each of the two regions is represented by the broken line 17, comprising alternate long and short dash portions, which is the sum of the densities of the discs 13 and 14 as indicated by the lines 15 and 16, respectively. The total density indicated by line 17 will obviously vary linearly as the discs 13 and 14 are further rotated from their initial positions.

Figure 5:
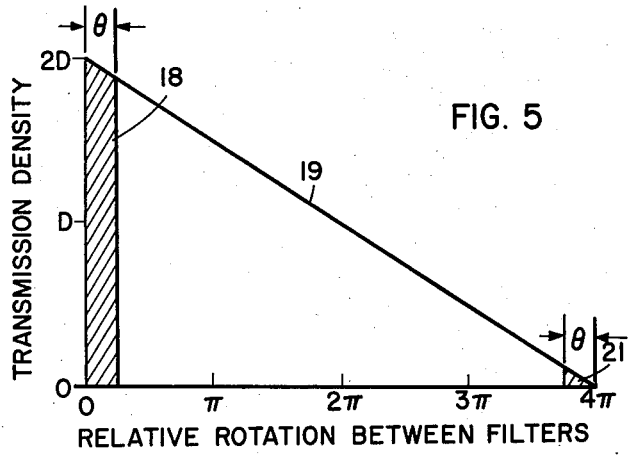
FIG. 5 is a graphical representation of the variation in uniform filter transmission density obtainable over the lens element of the photographic optical system of FIG. 1.

FIG. 5 is a graphical representation of the variation in uniform filter transmission density obtainable over the lens element of the photographic camera system. The maximum uniform density of the filter arrangement approximately equals 2D, the sum of the maximum densities of each of the filter discs 13 and 14, and the minimum density thereof approximately equals zero. The boundary marking the abrupt transition from zero to maximum density D of each disc 13 and 14 may be initially positioned at the center of lens element 11. Each disc 13 and 14 is then rotated in the direction of the arrowheads of FIG. 1. When each disc has been rotated through an angle of $$\frac{\theta}{2}$$

or through an angle $\theta$ relative to each other, these boundaries will have moved off lens element 11. Lens 11 is unusable until this relative rotation of discs 13 and 14 has been accomplished, and this usable portion of the relative rotation cycle of discs 13 and 14 is indicated by the shaded portion 18 of FIG. 5. As discs 13 and 14 continue to rotate, the transmission density of the filter arrangement covering lens element 11 linearly varies downwardly toward zero, as indicated by curve 19. When the boundaries between zero and maximum density D of each of the discs 13 and 14 touch the edges of lens element 11 and move toward their initial positions at the center thereof, the lens element 11 again becomes unusable, as indicated by the shaded portion 21 under curve 19. It will therefore be apparent that the filter arrangement is unusable during the portion of the rotative cycle corresponding to the ratio between the angle $\theta$ and an angle equal to $2\pi$ radians.

Figure 6:
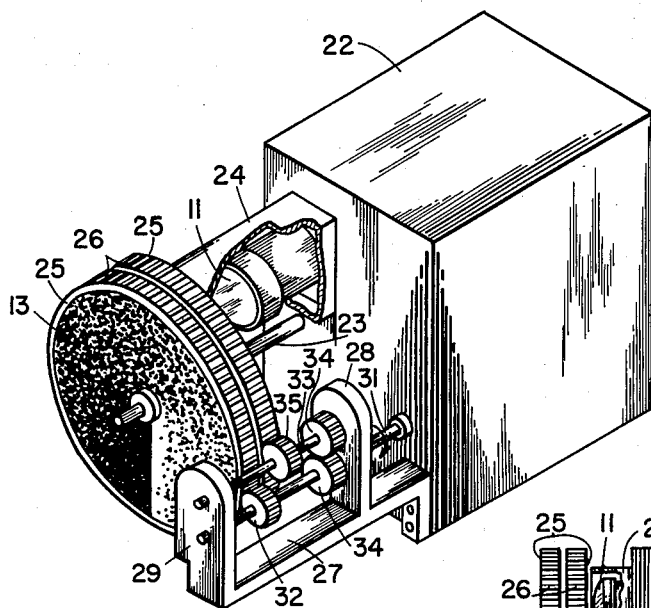
FIG. 6 is an isometric view of a high speed motion picture camera provided with the disc pair filter arrangement according to the present invention and, FIG. 7 is a partially schematic side elevational view of a photographic camera provided with the disc pair filter arrangement, including means responsive to illumination intensity for varying the density of the filter arrangement.

FIG. 6 is an isometric view of a high speed motion picture camera 22 provided with the disc pair filter arrangement for use in making temperature determinations of a heated object over very wide ranges. The camera 22 is of conventional construction, and is provided with a standard lens element 11. A fixed rod 23 projects from the forward face of the camera, and is spaced below but parallel to the sight axis of lens 11. A pair of filter discs 13 and 14 are rotatably secured to the free end of rod 23 and project across the line of sight of lens 11 in the manner illustrated in FIG. 1. A hollow bearing device may be mounted at the center of each of the discs 13 and 14 through which the free end of rod 23 may extend to reduce friction and wear as the discs rotate upon rod 23; the discs 13 and 14 being retained in position upon rod 23 by suitable retainer and spacer means. The filter discs 13 and 14 are spaced substantially adjacent one another; the gap therebetween being on the order of .02 inch to .05 inch, and in this view disc 14 is hidden behind disc 13. A tubular light shield 24 is connected to the forward face of camera 22 and projects outwardly therefrom, surrounding lens element 11. The free end of shield 24 is positioned immediately adjacent the side of filter disc 14 facing lens 11; shield 24 serving to prevent unfiltered light from passing through lens 11.

A preferably metallic rim element 25 is fixed to the periphery of each of the discs 13 and 14. The outer peripheral surface of each rim element 25 is provided with a plurality of gear teeth 26 parallel to the axis of rotation of the discs 13 and 14. A bracket member 27 is connected to the forward face of camera 22 and projects outwardly therefrom. A pair of flange elements 28 and 29 are formed on bracket member 27 and lie in spaced planes perpendicular to the axis of rotation of filter discs 13 and 14. Flange 28 is positioned at about half the distance from the forward face of camera 22 to the side of filter disc 14 nearest thereto. Flange 29 is positioned a distance from the forward face of camera 22 greater than the distance therefrom to the farthest side of filter disc 13. A shaft 31 projects from an aperture formed in the forward face of camera 22 and passes through aligned apertures provided in each of the flanges 28 and 29. The axis of shaft 31 is parallel to the axis of rotation of filter discs 13 and 14 and is spaced therefrom a selected distance greater than the outside radius of the gear teeth 26 provided on the rim elements 25. Shaft 31 is rotatably positioned in the apertures formed in the forward face of camera 22 and in flanges 28 and 29. The end of shaft 31 within camera 22 is geared to the drive mechanism thereof, not shown, in such a manner that operation of camera 22 causes rotation of shaft 31 in the direction indicated by the arrowhead at a predetermined rate. A spur gear 32 is rigidly mounted on shaft 31 between flanges 28 and 29 with the teeth thereof engaging the teeth 26 of the rim member 25 affixed to disc 13, thereby rotating disc 13 as camera 22 is operated. A shaft 33 is rotatably positioned in second apertures formed in flanges 28 and 29, and extends therebetween. Shaft 33 is parallel spaced relative to shaft 31; shafts 33 and 31 being equidistantly spaced from the axis of rotation of filter discs 13 and 14. Identical spur gears 34 are rigidly mounted on each of shafts 31 and 33 adjacent flange member 28; the teeth of gears 34 being mutually engaged. It will thus be seen that rotation of shaft 31 induces equal and opposite rotation of shaft 33. A spur gear 35 identical to gear 32 is rigidly mounted on shaft 33 and the teeth thereof engage the teeth 26 of rim member 25 affixed to disc 14, thereby causing disc 14 to rotate at the same speed but in the opposite direction to the rotation of disc 13.

It will be apparent that proper design of the gear train will permit rotation of the filter discs at a predetermined rate correlative with the speed of operation of motion picture camera 22. By way of example, when the camera 22 is used as a pyrometric recording device, eight frames of film may be exposed during one complete revolution of the discs 13 and 14. The angle θ which defines the unusable portion of the rotative cycle of the filter discs may be limited to π/4 radians, or one-eighth of the cycle, and this unusable portion of the cycle may be correlated with the exposure of one film frame. Photographs of a glowing object being rapidly heated may be made under linearly variable exposure conditions on the remaining seven frames during each rotative cycle of the filter discs. The operation described may be continued through as many cycles of rotation as may be necessary. The one unusable frame out of each eight frames may be treated to provide a standard of comparison for the photographs made by the remaining frames; for example, a shutter mechanism, not shown, in camera 22 may be provided to prevent exposure of this frame during the described operation, and these frames at another time exposed to a standard heat source. The photographs made by the operation set forth are such that a person skilled in the pyrometric art may construct a complete time-temperature history of the change in temperature of the object under test over a very wide temperature range.

Figure 7:
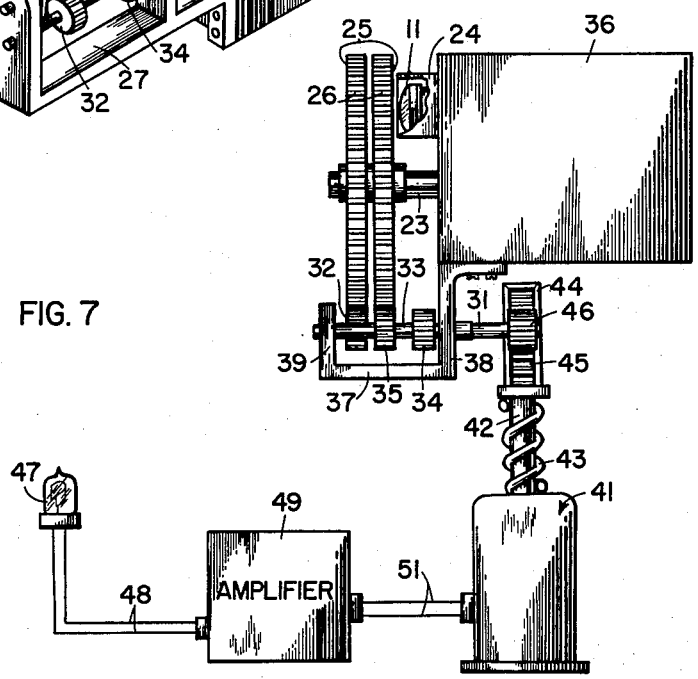

FIG. 7 is a partially schematic side elevational view of a photographic camera provided with the proposed filter arrangement, and having means responsive to illumination intensity for varying the density of the filter arrangement. A camera 36 of conventional design is provided with a standard lens 11. A fixed rod 23 projects outwardly from the forward face of camera 36 in similar manner to the rod 23 shown in FIG. 6, and a pair of filter discs 13 and 14 are rotatively mounted thereon as in FIG. 6. These discs 13 and 14 are also provided with the rims 25 having gear teeth 26. A light shield 24 encloses lens 11 as in FIG. 6. A bracket member 37 is connected to camera 36 and projects forwardly therefrom. The bracket 37 is provided with leg portions 38 and 39 positioned in planes perpendicular to the axis of rotation of filter discs 13 and 14. A shaft 31 is rotatably positioned in aligned apertures provided in each of legs 38 and 39 and extends therebetween, and also extends rearwardly from leg 38 but does not project into the interior of camera 36. A shaft 33 is also rotatively positioned in second apertures formed in each of legs 38 and 39 and extends therebetween, in this view partially observing shaft 31. Shafts 31 and 33 are positioned in spaced, parallel relation, and are equidistantly spaced a predetermined distance from and parallel to the axis of rotation of filter discs 13 and 14. Identical spur gears 34 are rigidly mounted on shafts 31 and 33 adjacent leg 38; the gear 34 mounted on shaft 31 being hidden behind the gear 34 mounted on shaft 33 in this view. The teeth of gears 34 are mutually interengaged, whereby rotation of shaft 31 will induce equal and opposite rotation of shaft 33. A spur gear 32 is rigidly mounted on shaft 31 with the teeth thereof engaged with the teeth 26 of the rim 25 affixed to filter disc 13, and an identical spur gear 35 is rigidly mounted on shaft 33 with the teeth thereof engaged with the teeth 26 of the rim 25 affixed to filter disc 14. It will be readily apparent, therefore, that rotation of shaft 31 will induce equal but opposite rotation of filter discs 13 and 14.

To effect rotation of shaft 31, a conventional solenoid, generally designated by the reference numeral 41, is positioned adjacent camera 36. Solenoid 41 is provided with a plunger 42 composed of a magnetizable substance such as soft iron, or the like, and a compression spring 43 arranged to normally maintain plunger 42 withdrawn from the exciting coil of solenoid 41. A rack element 44 provided with a plurality of transversely aligned gear teeth 45 is aligned with and extends from the exterior end of plunger 42. A spur gear 46 is rigidly mounted on the rearwardly extending end of shaft 31 and the teeth thereof are engaged with the teeth 45 of rack 44. It is thus apparent that movement of plunger 42 into the exciting coil of solenoid 41 will cause rotation of filter discs 13 and 14.

To utilize camera 36 to make a series of photographs of a subject under varying illumination, as in aerial photography of terrain, a photoelectric cell 47 may be provided for measuring the intensity of this illumination by direct exposure thereto. Conductors 48 connect the photoelectric cell 47 to a conventional amplifier 49 where the variation in input of the photoelectric cell is amplified and converted into current of a representative magnitude which is introduced into solenoid 41 by means of conductors 51. Electrical current introduced into the solenoid coil creates a force tending to draw plunger 42 into the hollow core thereof. The length of the stroke of plunger 42 is controlled by variation in the magnitude of current flow in the solenoid coil. It is apparent that the filter arrangement is directly responsive to the intensity of illumination available for photographic purposes; and that an increase in illumination intensity causes the filter discs 13 and 14 to rotate and increase the transmission density of the filter arrangement. Proper design of the components described above will assure a correlative balance between illumination intensity and transmission density. The filter discs 13 and 14 may be so initially positioned that the boundary marking the abrupt transition from zero to maximum density of each of the filter discs does not pass over camera lens 11.

Photoelectric cell 47 may be alternatively positioned in the image plane of lens 11 within camera 36. This expedient, not illustrated, provides an immediate exposure reference based upon the actual intensity of illumination imposed upon the photographic film. As the illumination exteriorly of camera 36 varies, the input of cell 47 instantaneously responds thereto, and the transmission density of the filter arrangement may be adjusted in accordance therewith through operation of solenoid 41. The operation of amplifier 41 may be such that current flow to solenoid 41 will vary until the illumination intensity impinging upon cell 47 returns to a predetermined level. The design tolerances of the mechanical linkage between solenoid 41 and the rims 25 affixed to discs 13 and 14 may be thus relaxed, since rotation of the discs 13 and 14 continues until the intensity of light admitted through lens 11 returns to a predetermined level.

Although specific examples of mechanism operable in a desired manner to vary the settings of the filter arrangement set forth in FIGS. 6 and 7 have been illustrated and described, it is to be understood that the particular mechanisms have been disclosed only by way of illustration, and not limitation, and that the invention contemplates the utilization of equivalent mechanisms to obtain similar results.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A recording optical pyrometer comprising the combination of a high speed motion picture camera having a lens and a filter arrangement comprising a pair of identical circular filter discs, said filter discs being mounted to centrally rotate about a common axis parallel with the sight axis of the lens and offset therefrom a distance greater than the distance between said sight axis and the periphery of said lens, the radius of said discs being greater than the distance between said common axis and the portion of said lens farthest therefrom, each disc exhibiting a continuously linearly varying transmission density characteristic as a radial line completely traverses a planar surface thereof, the arrangement of said identical circular filter discs each to the other being such that the density gradients of the two filter discs increase in opposite angular directions, said discs being contrarotatable for uniformly linearly varying the intensity of illumination admitted therethrough to said lens, and means connecting the drive mechanism of said camera with said discs for rotating said discs at equal velocities in angularly opposite directions at a rate to produce one complete revolution of each of said discs during the exposure of a predetermined plurality of frames of film within said camera.

2. A recording optical pyrometer comprising the combination of a high speed motion picture camera having a lens and a filter arrangement comprising a pair of identical circular filter discs, said filter discs being mounted to centrally rotate about a common axis parallel with the sight axis of the lens and offset therefrom a distance greater than the distance between said sight axis and the periphery of said lens, the radius of said discs being greater than the distance between said common axis and the portion of said lens farthest therefrom, each disc having an initial radial line with a transmission density value of substantially zero and each succeeding radial line around each disc in a circular direction being linearly greater in transmission density until a terminal radial line of maximum density immediately adjacent said initial radial line is reached, the arrangement of said identical circular filter discs each to the other being such that the density gradients of the two filter discs increase in opposite angular directions, said discs being contrarotatable for uniformly linearly varying the intensity of illumination admitted therethrough to said lens, and means connecting the drive mechanism of said camera with said discs for rotating said discs in angularly opposite directions at a rate to produce one complete revolution of each of said discs during the exposure of a predetermined number of frames of film within said camera.

3. A recording optical pyrometer comprising the combination of a high speed motion picture camera having a lens and a filter arrangement comprising a pair of identical circular filter discs overlying said lens, said filter discs being mounted to rotate centrally about a common axis parallel with the sight axis of the lens and offset therefrom a distance greater than the distance between said sight axis and the periphery of said lens, the radius of said discs being greater than the distance between said common axis and the portion of said lens farthest therefrom, each disc having an initial radial line with a transmission density value of substantially zero and each succeeding radial line around each disc in a circular direction being linearly greater in transmission density until a terminal radial line of maximum density immediately adjacent said initial radial line is reached, the arrangement of said identical circular filter discs each to the other being such that the density gradients of the two filter discs increase in opposite angular directions, and means connected with the drive mechanism of the camera for rotating said filter discs in angularly opposite directions at equal velocities to produce one complete revolution of each of said filter discs during the exposure of a preselected number of frames of film within said camera, the angular sector in radians of each of said discs overlying said lens being divisible into $2\pi$ radians with the result being equal to the number of frames of film exposed within said camera during one complete revolution of each of said filter discs.

References Cited in the file of this patent

UNITED STATES PATENTS

| | | |
|---|---|---|
| 2,478,406 | Lamb | Aug. 9, 1949 |
| 2,590,080 | Adams | Mar. 25, 1952 |
| 2,637,243 | Marx | May 5, 1953 |
| 2,757,232 | Goodale | July 31, 1956 |